United States Patent
Zada et al.

(10) Patent No.: US 11,150,890 B2
(45) Date of Patent: Oct. 19, 2021

(54) FILE SYSTEM SYNCHRONIZATION-BASED UPDATING

(71) Applicant: International Business Machines Corporation, Armonk, NY (US)

(72) Inventors: Eliran Zada, Rosh Haayin (IL); Amit Margalit, Hod-Hasharon (IL); Eli Koren, Shoham (IL); Vadim Idelchuk, Rishon Le-Zion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/568,468

(22) Filed: Sep. 12, 2019

(65) Prior Publication Data

US 2021/0081191 A1 Mar. 18, 2021

(51) Int. Cl.
  *G06F 8/654* (2018.01)
  *G06F 9/4401* (2018.01)

(52) U.S. Cl.
  CPC .......... *G06F 8/654* (2018.02); *G06F 9/4401* (2013.01)

(58) Field of Classification Search
  CPC .............................. G06F 8/654; G06F 9/4401
  See application file for complete search history.

(56) References Cited

U.S. PATENT DOCUMENTS

| | | | | |
|---|---|---|---|---|
| 6,615,404 B1* | 9/2003 | Garfunkel | | G06F 8/654 |
| | | | | 717/173 |
| 7,904,895 B1* | 3/2011 | Cassapakis | | G06F 8/654 |
| | | | | 717/168 |
| 8,074,112 B1* | 12/2011 | Chang | | G06F 11/1441 |
| | | | | 714/14 |
| 8,438,564 B2 | 5/2013 | Zhou et al. | | |
| 8,468,334 B1* | 6/2013 | Jonna | | G06F 9/4403 |
| | | | | 713/2 |
| 8,621,461 B1* | 12/2013 | Chandrachari | | G06F 9/45545 |
| | | | | 718/1 |
| 8,977,801 B2 | 3/2015 | Grube et al. | | |
| 9,021,141 B2* | 4/2015 | El-Batal | | G06F 11/1441 |
| | | | | 710/1 |

(Continued)

FOREIGN PATENT DOCUMENTS

EP 3223133 A1 9/2017

OTHER PUBLICATIONS

Wu et al., "WorkOut: I/O Workload Outsourcing for Boosting RAID Reconstruction Performance", FAST '09: 7th USENIX Conference on File and Storage Technologies, 14 pages. https://pdfs.semanticscholar.org/9020/3ef3de44812472d111707241fb61a8f0fb0c.pdf.

*Primary Examiner* — Douglas M Slachta
(74) *Attorney, Agent, or Firm* — Timothy J. Singleton

(57) ABSTRACT

A method, system, and computer program product for file system synchronization-based updating is provided. The method identifies an update request associated with a software update. Based on the update request, the method modifies one or more data object on a synchronization array. The modification to the data object corresponds to the software update of the update request. The method validates the modification to the one or more data objects to ensure a match between elements of the synchronization array. A persistent RAM state is established for an element of the synchronization array. The method initiates a reboot to complete the update request. The reboot applies the software update to one or more elements of the synchronization array.

20 Claims, 6 Drawing Sheets

(56) References Cited

U.S. PATENT DOCUMENTS

| | | | |
|---|---|---|---|
| 9,436,558 B1* | 9/2016 | Per | G06F 11/1451 |
| 9,559,842 B2 | 1/2017 | Baldwin et al. | |
| 9,804,855 B1 | 10/2017 | Paningipalli et al. | |
| 10,152,263 B2 | 12/2018 | Wilson | |
| 10,579,465 B1* | 3/2020 | Neustrom | G06F 11/0721 |
| 2006/0015683 A1* | 1/2006 | Ashmore | G06F 11/1441 |
| | | | 711/113 |
| 2006/0139069 A1* | 6/2006 | Frank | G06F 1/30 |
| | | | 327/143 |
| 2008/0022410 A1* | 1/2008 | Diehl | G06F 9/4418 |
| | | | 726/26 |
| 2009/0150598 A1* | 6/2009 | Jung | G06F 11/1666 |
| | | | 711/103 |
| 2010/0005285 A1* | 1/2010 | Yun | G06F 1/1656 |
| | | | 713/2 |
| 2011/0138118 A1* | 6/2011 | Cheong | G06F 11/1456 |
| | | | 711/112 |
| 2013/0125107 A1* | 5/2013 | Bandakka | G06F 11/1448 |
| | | | 717/171 |
| 2013/0145141 A1* | 6/2013 | Han | G06F 8/65 |
| | | | 713/2 |
| 2014/0281463 A1* | 9/2014 | Even | G06F 1/32 |
| | | | 713/2 |
| 2015/0178097 A1* | 6/2015 | Russinovich | G06F 9/442 |
| | | | 713/2 |
| 2015/0347124 A1* | 12/2015 | Sotani | G06F 8/654 |
| | | | 717/170 |
| 2016/0224359 A1* | 8/2016 | Ayanam | G06F 3/06 |
| 2019/0079746 A1* | 3/2019 | Thomas | G06F 8/61 |
| 2019/0243635 A1* | 8/2019 | Van Sickle | G06F 11/1004 |

* cited by examiner

FILE SYSTEM SYNCHRONIZATION-BASED UPDATING

BACKGROUND

Booting operating systems for computing devices often involves reading multiple data items in a short time frame. The data being read may be located on multiple logical and physical devices working together. Synchronization implementations, for logical and physical devices, often issue I/O requests divided between devices. When requests are divided between devices, a device which finishes requests will receive a next set of requests. A device operating at a slower pace receives fewer requests than the faster device.

SUMMARY

According to an embodiment described herein, a computer-implemented method for file system synchronization-based updating is provided. The method identifies an update request associated with a software update. Based on the update request, the method modifies one or more data objects on a synchronization array. The modification to the data objects corresponds to the software update of the update request. The method validates the modification to the one or more data objects to ensure a match between elements of the synchronization array. A persistent RAM state is established for an element of the synchronization array. The method initiates a reboot to complete the update request. The reboot applies the software update to one or more elements of the synchronization array.

According to an embodiment described herein, a system for file system synchronization-based updating is provided. The system includes one or more processors and a computer-readable storage medium, coupled to the one or more processors, storing program instructions that, when executed by the one or more processors, cause the one or more processors to perform operations. The system identifies an update request associated with a software update. Based on the update request, the system modifies one or more data object on a synchronization array. The modification to the data object corresponds to the software update of the update request. The system validates the modification to the one or more data objects to ensure a match between elements of the synchronization array. A persistent RAM state is established for an element of the synchronization array. The system initiates a reboot to complete the update request. The reboot applies the software update to one or more elements of the synchronization array.

According to an embodiment described herein a computer program product for file system synchronization-based updating is provided. The computer program product identifies an update request associated with a software update. Based on the update request, the computer program product modifies one or more data object on a synchronization array. The modification to the data object corresponds to the software update of the update request. The computer program product validates the modification to the one or more data objects to ensure a match between elements of the synchronization array. A persistent RAM state is established for an element of the synchronization array. The computer program product initiates a reboot to complete the update request. The reboot applies the software update to one or more elements of the synchronization array.

DETAILED DESCRIPTION

Figure 1:
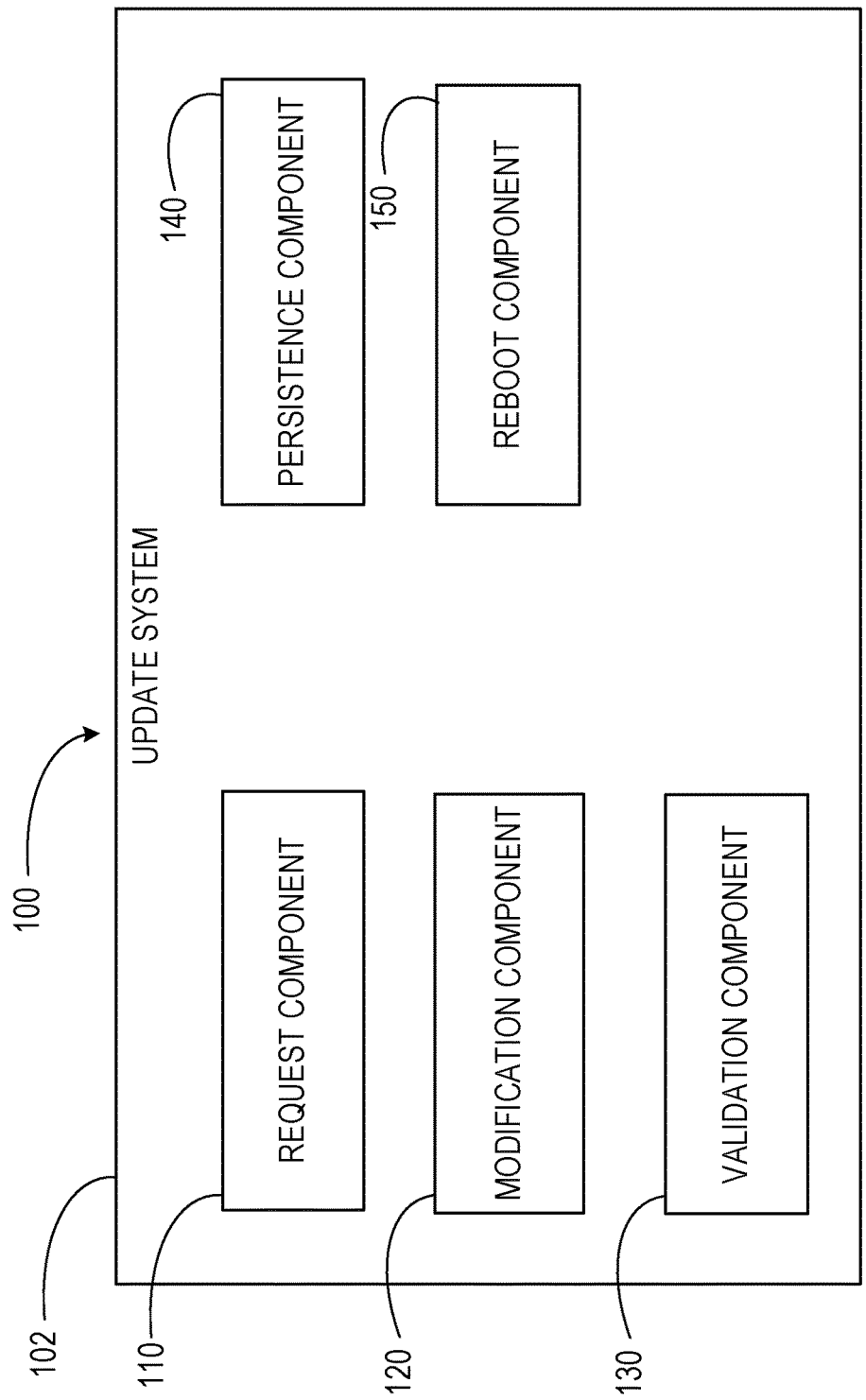
FIG. 1 depicts a block diagram of a computing environment for implementing concepts and computer-based methods, according to at least one embodiment.

The present disclosure relates generally to methods for updating computing systems, but not exclusively, to a computer-implemented method for file system synchronization-based updating. The present disclosure relates further to a related system for file system updating, and a computer program product for operating such a system.

Booting of computing systems involves reading multiple data items in relatively short periods of time. Reboot times for newly updated operating systems may limit a computing system's ability to provide continuous services. In clustered servers employing simultaneous updates, reboot times of each server become important. Data for such booting operations may be distributed across physical and logical systems. Such devices may be synchronized and work together in synchronization configurations, such as RAID. Some synchronization methodologies assume symmetry between the devices and shorten boot time by dividing data read operations. Relative speeds of synchronized devices may limit time improvements of synchronizing methods for known systems.

Embodiments of the present disclosure decrease operating system load time and increase speeds for software updates by rebooting from a RAM disk. The RAM disk may serve as a device synchronized with a persistent boot device, such as a hard drive. RAM disks may be synchronized to other boot devices in multiple ways, such as a RAID-1 mirror array. Embodiments of the present disclosure, using RAM disk, provide faster booting times than traditional media disks, such as SSD and HDD. These embodiments may also decrease read latency, increase read speeds, and generally reduce OS boot times.

Some embodiments of the present disclosure may use operating system kernel capabilities to identify RAM disk pages and provide persistence to data stored thereupon during a reboot of a new kernel. Some embodiments of the present disclosure reduce software upgrade times and reduce risks of host disconnections in embodiments of storage systems which perform software upgrades for system components simultaneously. In such instances, systems may pause serving I/O from connected hosts and reducing software update times may reduce a likelihood of host disconnections.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown, according to at least one embodiment. The present disclosure may be implemented within the example computing environment 100. In some embodiments, the computing environment 100 may be included within or embodied by a computer system, described below. The computing environment 100 may include an update system 102. The update system 102 may comprise a request component 110, a modification component 120, a validation component 130, a persistence component 140, and a reboot component 150. The request component 110 identifies update requests associated with updates, such as software updates. The modification component 120 modifies one or more data objects on a synchronization array. The validation component 130 validates the modification to the one or more data objects to ensure a match between elements of the synchronization array. The persistence component 140 establishes a persistent RAM state for an element of the synchronization array. The reboot component 150 initiates a reboot to complete the update request. Although described with distinct components, it should be understood that, in at least some embodiments, components may be combined or divided, or additional components may be added, without departing from the scope of the present disclosure.

Figure 2:
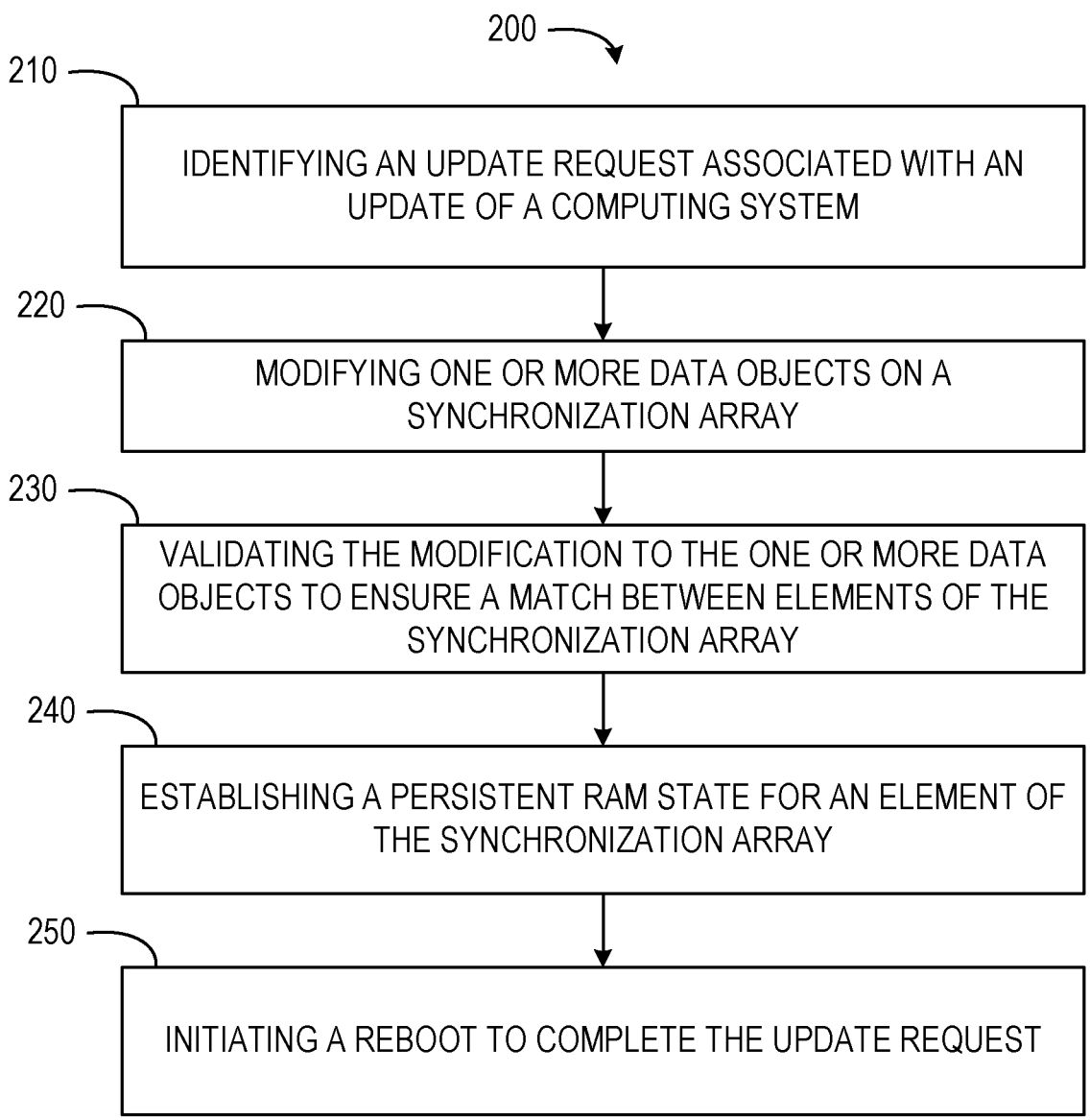
FIG. 2 depicts a flow diagram of a computer-implemented method for file system synchronization-based updating, according to at least one embodiment.

Referring now to FIG. 2, a flow diagram of a computer-implemented method 200 is shown, according to at least one embodiment. The computer-implemented method 200 is a method for file system synchronization-based updating. In some embodiments, the computer-implemented method 200 may be performed by one or more components of the computing environment 100, as described in more detail below.

At operation 210, the request component 110 identifies an update request associated with an update. The update may be a software update, a firmware update, a file system update, an operating system update, a bios update, combinations thereof, or any other suitable and relevant update. The update may be configured to apply to a computing system with volatile memory devices and non-volatile memory devices. The volatile memory devices may include random-access memory (RAM) as a primary storage device. For example, the volatile memory devices may include one or more RAM chips, such as static random-access memory (SRAM) chips or dynamic random-access memory (DRAM) chips. The non-volatile memory devices may include read only memory (ROM) as a secondary storage device. For example, the non-volatile memory devices may include one or more hard drives. Although described with respect to a computing system, it should be understood that the present disclosure may operate on a plurality of computing systems in a cluster environment.

The update request may be received from a network resource, such as an update server. In some embodiments, the update request is received at a computing device. The computing device may be running the update system 102 or one or more components thereof. The computing device may receive the update as a scheduled update, a dynamic update (e.g., an update responding to a security issue), a user requested or selected update, or any other suitable update mechanism.

In some embodiments, once the request component 110 receives the update request, the request component 110 communicates with the reboot component 150. The reboot component 150 may be triggered, by the request component 110, to perform one or more update initiation procedures. In some embodiments, update initiation procedures include stoppage or disconnection processes, causing one or more processors of the computing system to cease one or more current operations or processes and place the computing system in a safe state suitable for rebooting the computing system. In some embodiments, once the reboot component 150 receives the update request, the reboot component 150 identifies one or more operations or processes currently running or scheduled to run, within a specified time period, on the computing system. The reboot component 150 may initiate a stoppage or termination command with the one or more operations or processes. The stoppage or termination command may cause the one or more operations to safely terminate, pause, or otherwise cease using processor and/or memory resources. The reboot component 150 may also initiate a disconnection command to terminate one or more connections using memory or processing resources which would interfere with a relevant update.

In some embodiments, upon receiving the update request, the request component 110 cooperates with the validation component 130 to determine one or more update conditions exist for the computing system on which the update is to be applied. The validation component 130 may analyze current software configurations of the computing system and pending configurations described by the update. In some embodiments, the validation component 130 determines the OS kernels (e.g., old and new) of the computing system support RAM disks. The validation component 130 determines the OS kernels of the computing system support booting from a RAM disk. The validation component 130 determines the OS kernels of the computing system support boot-surviving RAM sections. For example, the validation component 130 determines the computing system supports Tagmem and/or Xmem. In some embodiments, the validation component 130 determines the OS kernels (e.g., old and new) of the computing system support synchronization solutions between a physical boot media and a RAM disk.

At operation 220, the modification component 120 modifies one or more data objects on a synchronization array. In some embodiments, the synchronization array is a RAID array, such as a RAID-1 array (e.g., a mirror array). The modification may be performed in response to or based on the update request. In some embodiments, the modification to the one or more data objects corresponds to the software update of the update request. The modification component 120 may initially prepare the data items or data objects by conforming the data items or objects to a structure used for the update. In some embodiments, the modification component 120 determines one or more configuration characteristics for data objects described in the update request. The modification component 120 modifies data objects in the synchronization array according to the configuration characteristics. Once configuration characteristics are compatible, the modification component 120 modifies, overwrites, or otherwise stores new values for the data objects in the synchronization array. The new values for the data objects may be values described by or contained within the update request. The new values may be instructions, values, configurations, or any other suitable modifications to one or more of a software, firmware, application, operating system, file system, combinations thereof, or any other logically modifiable aspect of the computing system.

In some instances, the modification component 120 modifies the one or more data objects by copying an update package to the synchronization array. Copying the data package may cause the modification component 120 to replace one or more instructions, computer code, data, or other aspects contained within the synchronization array. The replaced aspects within the synchronization array may apply to software, firmware, application, operating system, file system, combinations thereof, or any other logically modifiable aspect of the computing system. Once copied, the update package may be applied upon rebooting or restarting the computing system.

At operation 230, the validation component 130 validates the modification to the one or more data objects to ensure a match between elements of the synchronization array. In some instances, the validation component 130 validates the modification by establishing the synchronization array as a RAID-1 array (e.g., a mirror array). The elements of the synchronization array may include a persistent boot medium and a RAM disk. The validation component 130 may validate the modification by synchronizing or ensuring synchronization between physical media (e.g., the physical boot medium, a portion of secondary storage, or a portion of a hard drive) with the RAM disk (e.g., a portion of RAM placed into a persistent state).

In some embodiments, the validation component 130 determines data synchronization between the RAM disk and the persistent boot medium. The validation component 130 may determine data synchronization between the elements by validating a health or completeness of the data synchronization. In some embodiments, the validation component 130 compares data objects, metadata, hash values, checksum values, combinations thereof, or any other suitable and relevant data for the RAM disk and the persistent boot medium. Where a match is found between the RAM disk and the persistent boot medium, the validation component 130 may identify the RAM disk and persistent boot medium as being synchronized. In some embodiments, the validation component initially determines an existence of the RAM disk and the persistent boot medium. Where the RAM disk is not found, the validation component 130 cooperates with other components of the update system 102 to perform operations to create a RAM disk, as described below. Further, where the RAM disk is found to be out of synchronization with the persistent boot medium, the validation component 130 cooperates with other components of the update system 102 to synchronize the two elements, as described below.

In some embodiments, to determine data synchronization, the validation component 130 identifies an absence of a RAM disk in the synchronization array. The validation component 130 may determine that no RAM disk was previously created during a previous update or installation operation. In some embodiments, the validation component 130 identifies the absence of the RAM disk by determining that a previously generated RAM disk is corrupted, incomplete, or otherwise inaccessible. In some embodiments, the validation component 130 identifies the absence of the RAM disk by determining that a version, image, or content of an existing RAM disk is inapplicable. For example, where a RAM disk was previously created for a different installation or version of software, differing from a current version of software running on the computing device. In some embodiments, after identifying an absence of the RAM disk, the persistence component 140 generates a RAM disk, as described below with respect to operation 240.

In some embodiments, the validation component 130 determines the RAM disk and the persistent boot medium of the synchronization array are out of synchronization. The validation component 130 may determine the synchronization array is out of synchronization by comparing data objects within the persistent boot medium and the RAM disk. The validation component 130 may also determine unsynchronized elements by comparing metadata describing the persistent boot medium and the RAM disk. The validation component 130 may also compare a hash, checksum, or other derivation of data objects within the persistent boot medium and the RAM disk to determine the elements are out of synchronization.

Where the validation component 130 determines the elements are out of synchronization, the modification component 120 synchronizes the RAM disk and the persistent boot medium. The modification component 120 may utilize one or more capabilities of the computing system to synchronize the RAM disk and the persistent boot medium. In some embodiments, the modification component 130 uses a kernel's synchronization capabilities. In such instances, the modification component 120 sets up a synchronization array. The synchronization array may be set up between the physical boot media and the RAM disk.

At operation 240, the persistence component 140 establishes a persistent RAM state for an element of the synchronization array. In some embodiments, the persistence component 140 generates a RAM disk within a RAM medium (e.g., a RAM chip). The persistence component 140 may generate the RAM disk by utilizing capabilities of a kernel of the computing system. In some embodiments, the persistence component 140 generates the RAM disk using a kernel's boot-surviving RAM sections capability. In such instances, the persistence component 140, cooperating with or triggering the kernel, may generate a RAM disk capable of surviving or persisting through a boot or reboot operation. The RAM disk may occupy a portion of the RAM media, coupled to the one or more processors. The RAM disk, generated and stored on the RAM media, may be persistent so long as suitable conditions or permissions apply to the RAM disk. For example, the RAM disk may be persistent with no set duration or limitation. The RAM disk may also be configured to be persistent through a single boot or reboot operation, a specified period of time, a specified software life cycle, combinations thereof, or any other suitable and relevant condition or permission.

At operation 250, the reboot component 150 initiates a reboot to complete the update request. In some embodiments, the reboot applies the software update to one or more elements of the synchronization array. In embodiments where the validation component 130 determines data synchronization, the reboot component initiates the software update associated with the update request. The reboot component 150 may perform a reboot when RAM sections of the RAM disk are persistent or configured to survive the reboot. For example, in a Linux OS, a kexec command performs a boot from existing kernel into a new kernel when some or all of the RAM disk pages are under appropriate conditions to ensure they survive the reboot. In some instances, the reboot terminates other operations, closes the operating system of the computing component, and applies an update package associated with the update request.

Figure 3:
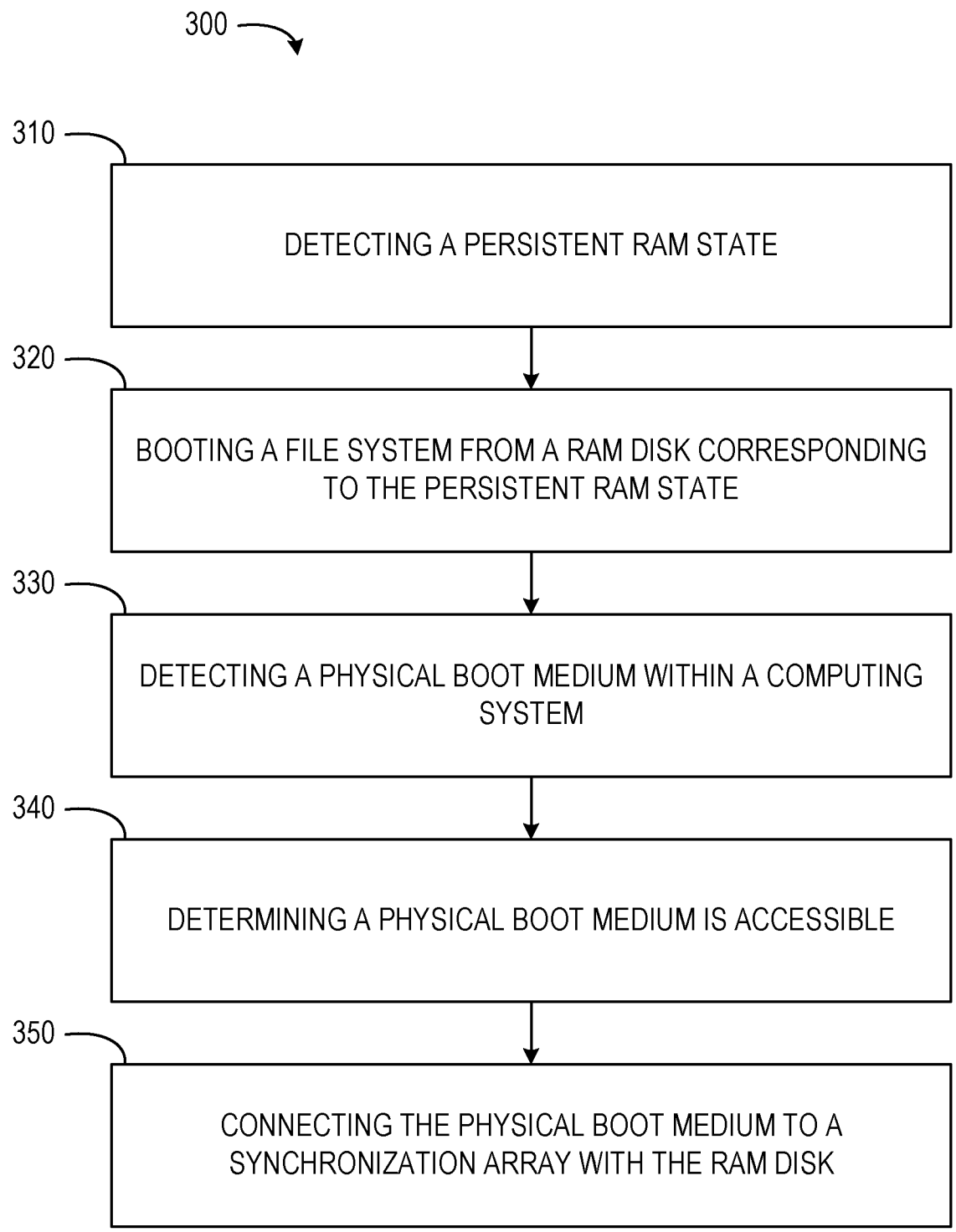
FIG. 3 depicts a flow diagram of a computer-implemented method for file system synchronization-based updating, according to at least one embodiment.

FIG. 3 shows a flow diagram of an embodiment of a computer-implemented method 300 for file system synchronization-based updating. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the persistence component 140 detects the persistent RAM state. The persistent RAM state may be detected in response to initiating a reboot. The persistence component 140 (e.g., a part of or cooperating with an updated kernel) searches for the RAM disk in a portion of RAM memory designated for persistent RAM data (e.g., the persistent RAM state). Upon locating the persistent RAM state, the persistence component 140 may cooperate with the reboot component 150 to continue the reboot of the computing system and application of the update.

At early stages of a boot sequence, such as a boot sequence after updating a kernel, the physical boot device may not be ready for operation and may remain in an unavailable state for a period of time. Such period of time of unavailability may slow or delay restart and operation of the computing system. Booting from the persistent RAM data may increase speed of the booting operations due to read and write latency of the RAM media. Further, booting from the persistent RAM data may increase speed of the booting operations since RAM media may be available sooner than secondary storage in boot stages.

In some embodiments, where the persistence component 140 or the reboot component 150 fail to detect the persistent RAM state or unable to detect a RAM disk file system, the reboot component 150 initiates an alternate boot procedure. In some instances, the reboot component 150 initiates or attempts to reboot using the physical boot medium (e.g., the persistent boot medium). The reboot component 150 may attempt to access the physical boot medium and initiate booting operations from a file system stored therein.

In operation 320, the reboot component 150 boots a file system from a RAM disk corresponding to the persistent RAM state. Once the persistence component 140 detects the persistent RAM state, the reboot component 150 may mount a file system in the RAM disk. The reboot component 150 the begins rebooting the computing system from the file system in the RAM disk. Since the reboot component 150 considers the RAM disk as part of the synchronization array, the RAM disk may be used to boot the computing system despite the physical boot medium being unavailable.

In operation 330, the reboot component 150 detects a physical boot medium within the computing system. The reboot component 150 may detect the physical boot medium based on physical connections within the computing system. The reboot component 150 may proceed in a boot order, sequentially accessing and initiating operation of components of the computing system. In some embodiments, the reboot component 150 fails to detect the physical boot medium. In such instances, the reboot component 150 will proceed with booting the computing system using the RAM disk and the file system stored therein.

In operation 340, the reboot component 150 determines the physical boot medium is accessible. The reboot component 150 may determine accessibility of the physical boot medium by any suitable method. In some embodiments, the reboot component 150 determines accessibility by spinning a hard drive or otherwise initiating operation of the physical boot medium. The reboot component 150 may determine the physical boot medium is accessible by transmitting a boot instruction to the physical boot medium and receiving a suitable response.

In some embodiments, where the reboot component 150 is unable to access the physical boot device or the validation component 130 fails to fully synchronize the synchronization array, the update system 102 may perform one or more decision-making operations. The decision-making operations may select an abort operation, where the update is aborted. The decision-making operations may also elect to rely on the RAM disk for the update.

In operation 350, the reboot component 150 connects the physical boot medium to the synchronization array. Once connected, the reboot component 150 may enable the computing system to proceed with normal operation using the updated aspects associated with the update request.

In some embodiments, the reboot component 150 determines a synchronization discrepancy between the physical boot medium and the RAM disk of the synchronization array. The synchronization discrepancy may occur between a boot operation from the RAM disk and the physical boot medium becoming accessible. The reboot component 150, cooperating with the validation component 130 may determine the discrepancy by comparing data objects, metadata, a checksum, a hash, or other data relating to the RAM disk with similar data for the physical boot medium. In some instances, the validation component 130 compares the RAM disk and physical boot medium in a manner similar to or the same as described above.

The reboot component 150 may cooperate with the modification component 120 to synchronize the physical boot medium with the RAM disk. The modification component 120 may update one or more aspects, data structures, data objects, computer readable instructions, combinations thereof, or any other suitable and relevant portions of the physical boot medium to reflect similar data in the RAM disk. The modification component 120 may use synchronization implementation mechanisms to synchronize changes made to the RAM disk between a time the computing system was booted until a time the physical boot medium became available and connected.

Figure 4:
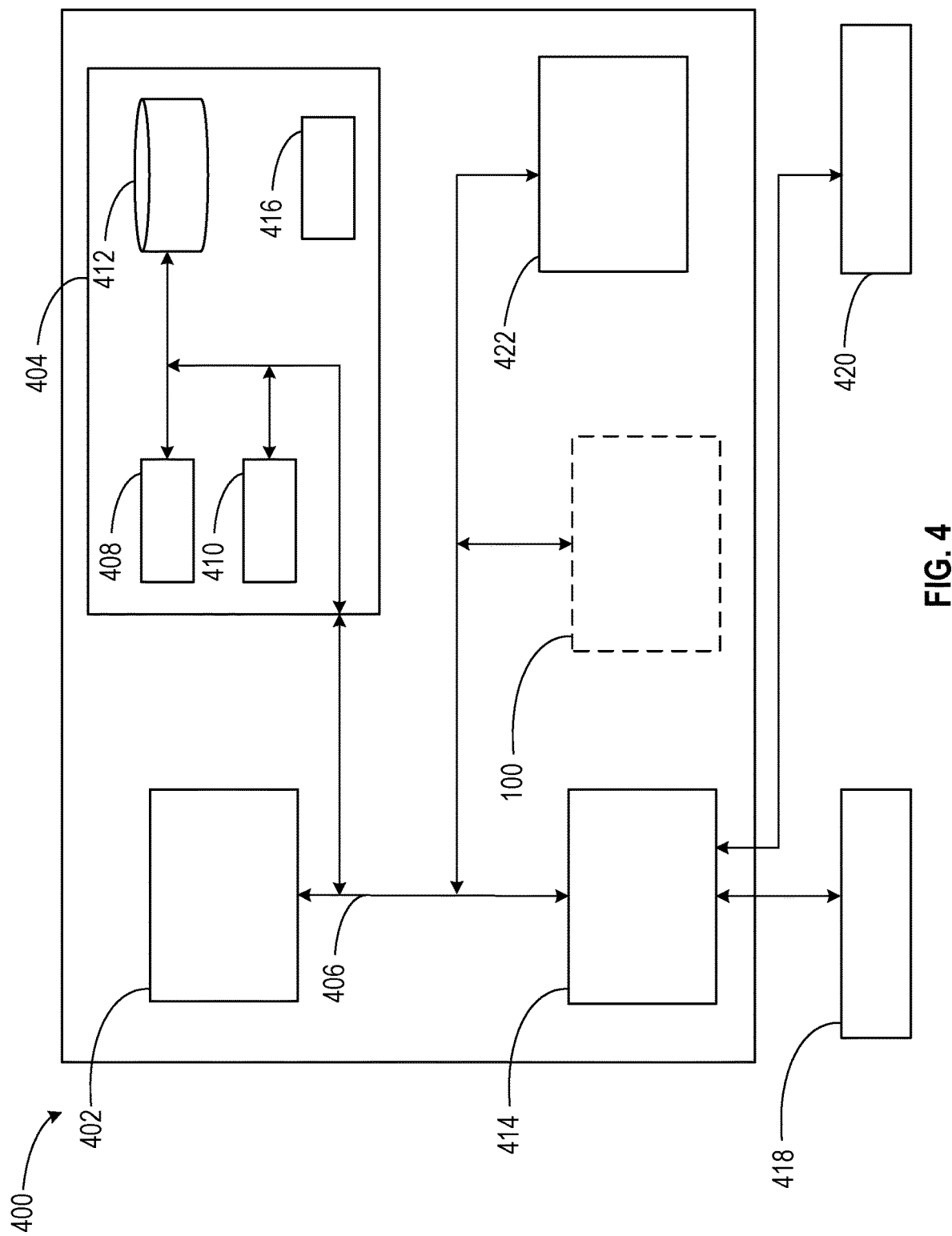
FIG. 4 depicts a block diagram of a computing system for file system synchronization-based updating, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for file system synchronization-based updating.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the request component 110, the modification component 120, the validation component 130, the persistence component 140, and the reboot component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
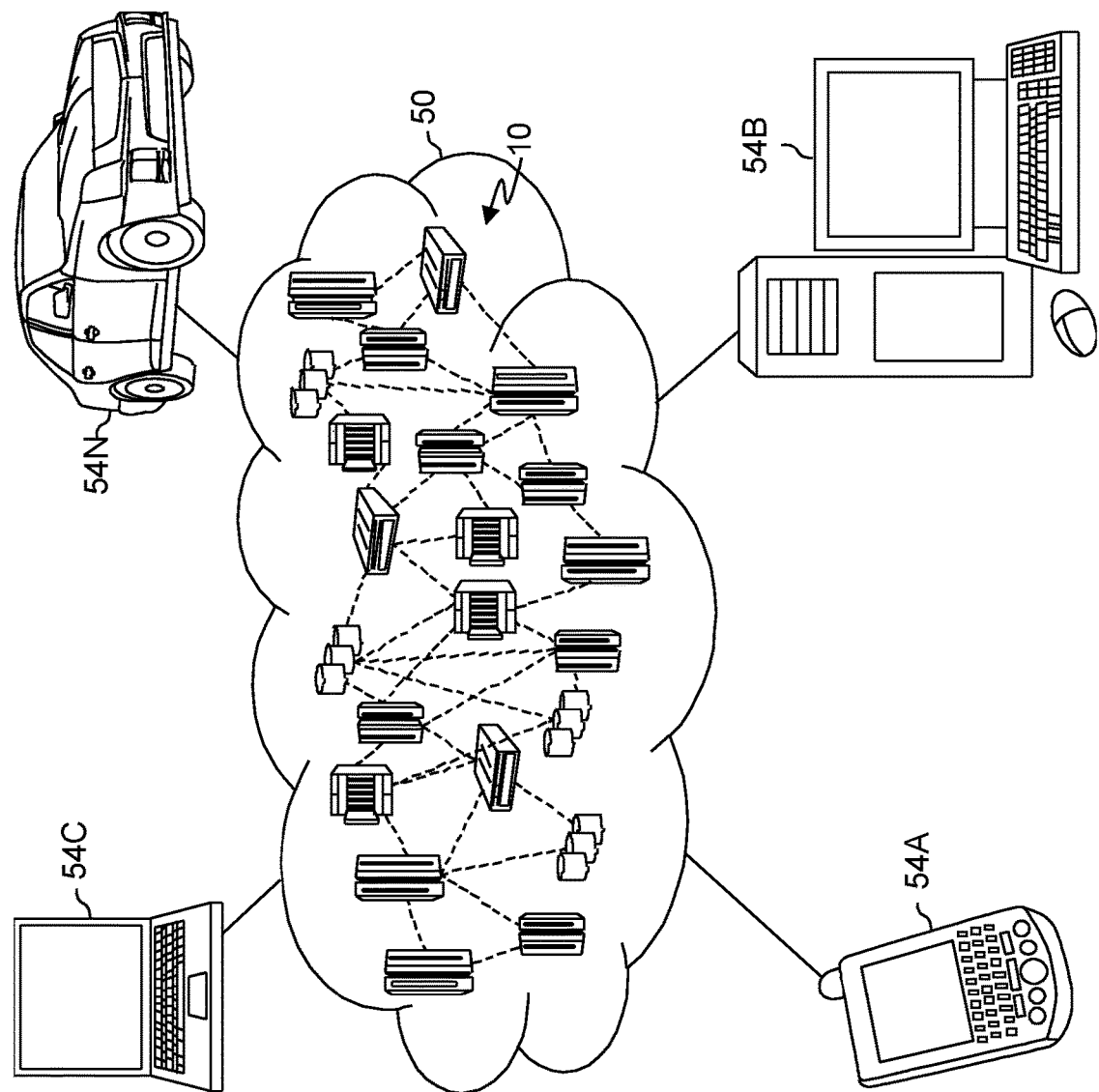
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
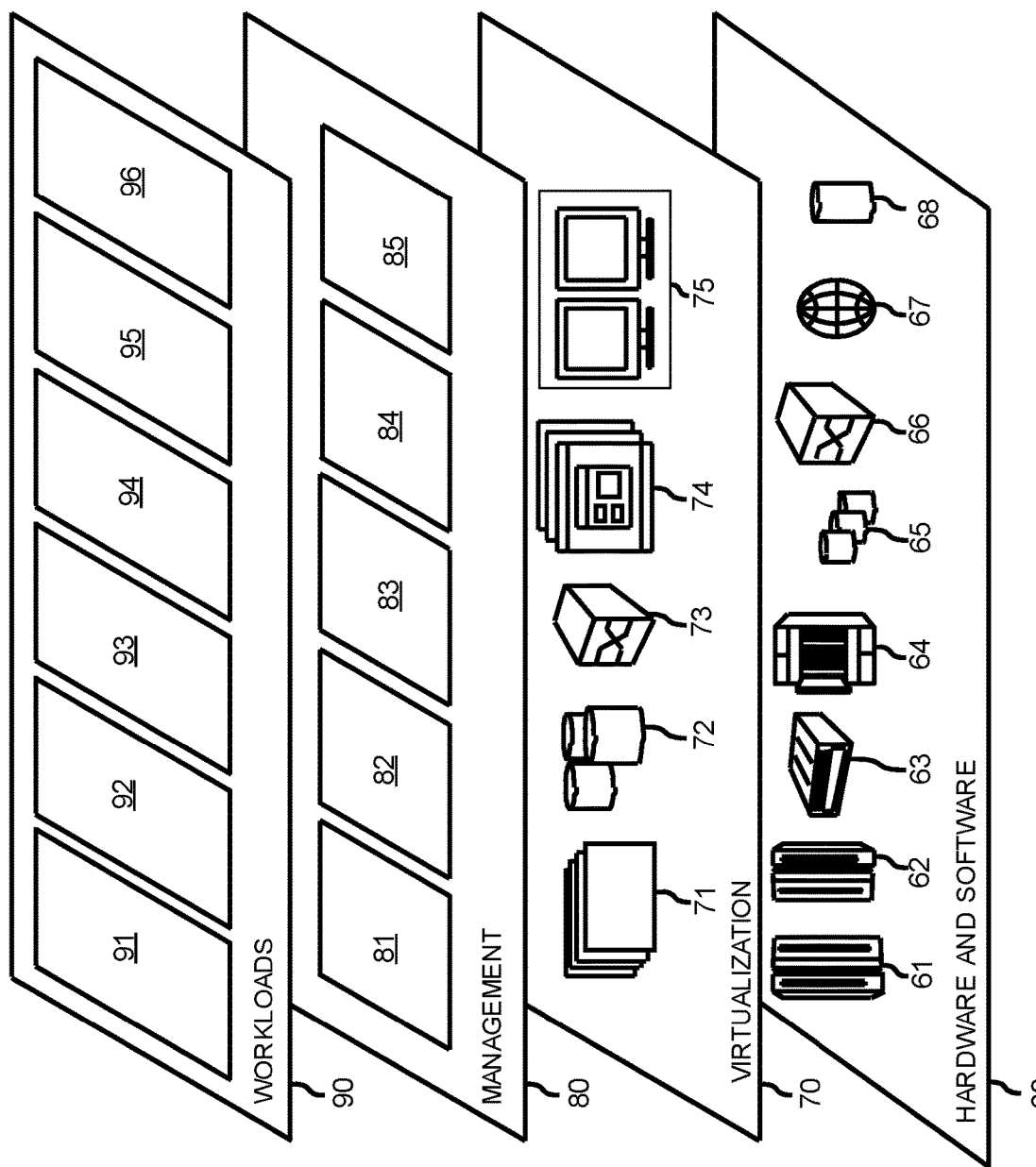
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying an update request for a computing system, the update request associated with an Operating System (OS) update;
   based on the update request, modifying one or more data objects on a synchronization array, the synchronization array being a redundant array of independent disks (RAID) including at least a portion of a random-access memory (RAM) of a computing device and a computer readable storage medium of the computing device, the modification to the one or more data objects storing one or more new values for the one or more data objects corresponding to the OS update of the update request;
   validating the modification to the one or more data objects to ensure a match between elements of the synchronization array;
   establishing a persistent RAM state for an element of the synchronization array on the RAM of the computing device, the element of the synchronization array containing the one or more data objects corresponding to the OS update; and
   initiating a reboot of the computing system to complete the update request using an updated kernel associated with the OS update, the updated kernel accessing the persistent RAM state and the reboot of the computing system initiating from the persistent RAM state for the element of the synchronization array and applying the OS update to one or more elements of the synchronization array.

2. The method of claim 1, wherein the elements of the synchronization array include a persistent boot medium and a RAM disk.

3. The method of claim 2, further comprising:
   determining data synchronization between the RAM disk and the persistent boot medium; and
   based on the data synchronization, initiating the OS update associated with the update request.

4. The method of claim 3, wherein determining the data synchronization further comprises:
   identifying absence of a RAM disk in the synchronization array;
   generating a RAM disk within a RAM media;
   determining the RAM disk and the persistent boot medium of the synchronization array are out of synchronization; and
   synchronizing the RAM disk and the persistent boot medium.

5. The method of claim 1, further comprising:
   in response to initiating the reboot, detecting the persistent RAM state; and
   based on detection of the persistent RAM state, booting a file system from a RAM disk corresponding to the persistent RAM state.

6. The method of claim 1, further comprising:
   detecting a physical boot medium within a computing system;
   determining the physical boot medium is accessible; and
   connecting the physical boot medium to the synchronization array.

7. The method of claim 6, further comprising:
   determining a synchronization discrepancy between the physical boot medium and a RAM disk of the synchronization array, the synchronization discrepancy occurring between a boot from the RAM disk and the physical boot medium being accessible; and
   synchronizing the physical boot medium with the RAM disk.

8. A system, comprising:
   one or more processors; and
   a computer-readable storage medium, coupled to the one or more processors, storing program instructions that, when executed by the one or more processors, cause the one or more processors to perform operations comprising:
      identifying an update request for a computing system, the update request associated with an Operating System (OS) update;
      based on the update request, modifying one or more data objects on a synchronization array, the synchronization array being a redundant array of independent disks (RAID) including at least a portion of a random-access memory (RAM) of a computing device and a computer readable storage medium of the computing device, the modification to the one or more data objects storing one or more new values for the one or more data objects corresponding to the OS update of the update request;

validating the modification to the one or more data objects to ensure a match between elements of the synchronization array;

establishing a persistent RAM state for an element of the synchronization array on the RAM of the computing device, the element of the synchronization array containing the one or more data objects corresponding to the OS update; and initiating a reboot of the computing system to complete the update request using an updated kernel associated with the OS update, the updated kernel accessing the persistent RAM state and the reboot of the computing system initiating from the persistent RAM state for the element of the synchronization array and applying the OS update to one or more elements of the synchronization array.

9. The system of claim 8, wherein the elements of the synchronization array include a persistent boot medium and a RAM disk.

10. The system of claim 9, wherein the operations further comprise:

determining data synchronization between the RAM disk and the persistent boot medium; and based on the data synchronization, initiating the OS update associated with the update request.

11. The system of claim 10, wherein determining the data synchronization further comprises:

identifying absence of a RAM disk in the synchronization array;

generating a RAM disk within a RAM media;

determining the RAM disk and the persistent boot medium of the synchronization array are out of synchronization; and synchronizing the RAM disk and the persistent boot medium.

12. The system of claim 8, wherein the operations further comprise:

in response to initiating the reboot, detecting the persistent RAM state; and based on detection of the persistent RAM state, booting a file system from a RAM disk corresponding to the persistent RAM state.

13. The system of claim 8, wherein the operations further comprise:

detecting a physical boot medium within a computing system;

determining the physical boot medium is accessible; and connecting the physical boot medium to the synchronization array.

14. The system of claim 13, wherein the operations further comprise:

determining a synchronization discrepancy between the physical boot medium and a RAM disk of the synchronization array, the synchronization discrepancy occurring between a boot from the RAM disk and the physical boot medium being accessible; and synchronizing the physical boot medium with the RAM disk.

15. A computer program product comprising a computer readable storage medium having program instructions embodied therewith, the program instructions being executable by one or more processors to cause the one or more processors to perform operations comprising:

identifying an update request for a computing system, the update request associated with an Operating System (OS) update;

based on the update request, modifying one or more data objects on a synchronization array, the synchronization array being a redundant array of independent disks (RAID) including at least a portion of a random-access memory (RAM) of a computing device and a computer readable storage medium of the computing device, the modification to the one or more data objects storing one or more new values for the one or more data objects corresponding to the OS update of the update request;

validating the modification to the one or more data objects to ensure a match between elements of the synchronization array;

establishing a persistent RAM state for an element of the synchronization array on the RAM of the computing device, the element of the synchronization array containing the one or more data objects corresponding to the OS update; and initiating a reboot of the computing system to complete the update request using an updated kernel associated with the OS update, the updated kernel accessing the the persistent RAM state and the reboot of the computing system initiating from the persistent RAM state for the element of the synchronization array and applying the OS update to one or more elements of the synchronization array.

16. The computer program product of claim 15, wherein the elements of the synchronization array include a persistent boot medium and a RAM disk, and the operations further comprise:

determining data synchronization between the RAM disk and the persistent boot medium; and based on the data synchronization, initiating the OS update associated with the update request.

17. The computer program product of claim 16, wherein determining the data synchronization further comprises:

identifying absence of a RAM disk in the synchronization array;

generating a RAM disk within a RAM media;

determining the RAM disk and the persistent boot medium of the synchronization array are out of synchronization; and synchronizing the RAM disk and the persistent boot medium.

18. The computer program product of claim 15, wherein the operations further comprise:

in response to initiating the reboot, detecting the persistent RAM state; and based on detection of the persistent RAM state, booting a file system from a RAM disk corresponding to the persistent RAM state.

19. The computer program product of claim 15, wherein the operations further comprise:

detecting a physical boot medium within a computing system;

determining the physical boot medium is accessible; and connecting the physical boot medium to the synchronization array.

20. The computer program product of claim 19, wherein the operations further comprise:

determining a synchronization discrepancy between the physical boot medium and a RAM disk of the synchronization array, the synchronization discrepancy occurring between a boot from the RAM disk and the physical boot medium being accessible; and synchronizing the physical boot medium with the RAM disk.

\* \* \* \* \*